United States Patent
Cadwallader et al.

(10) Patent No.: US 6,564,925 B1
(45) Date of Patent: May 20, 2003

(54) GRAVITY ASSISTED CYLINDER ALIGNING FEEDER AND ELEMENT SEPARATOR

(75) Inventors: Robert H. Cadwallader, Stanfordville, NY (US); Yu-Cheng Lee, Poughkeepsie, NY (US)

(73) Assignee: Mechanical Plastics Corp., Elmsford, NY (US)

( * ) Notice: Subject to any disclaimer, the term of this patent is extended or adjusted under 35 U.S.C. 154(b) by 0 days.

(21) Appl. No.: 09/620,438

(22) Filed: Jul. 20, 2000

(51) Int. Cl.[7] .............................................. B65G 47/12
(52) U.S. Cl. ...................................................... 198/443
(58) Field of Search ................................. 198/382, 383, 198/443, 446

(56) References Cited

U.S. PATENT DOCUMENTS

| | | | | |
|---|---|---|---|---|
| 4,583,635 A | * | 4/1986 | Timmer et al. | 198/443 X |
| 4,984,678 A | * | 1/1991 | Fauchard | 198/443 |
| 5,353,914 A | * | 10/1994 | Stephen et al. | 198/443 |
| 5,427,224 A | * | 6/1995 | Suehara et al. | 198/443 X |
| 5,765,676 A | * | 6/1998 | Kalm | 198/443 |

FOREIGN PATENT DOCUMENTS

| | | | | |
|---|---|---|---|---|
| EP | 192594 | * | 8/1986 | 198/443 |
| FR | 2456060 | * | 1/1981 | 198/443 |
| JP | 2-305709 | * | 12/1990 | 198/443 |

* cited by examiner

Primary Examiner—James R. Bidwell
(74) Attorney, Agent, or Firm—Israel Nissenbaum

(57) ABSTRACT

An open ended cylinder element having a longitudinal axis is positioned parallel to the ground and is configured and adapted to be rotatable around its longitudinal axis. A funnel element is longitudinally positioned within the center of the cylinder in a fixed position, with the cylinder being rotatable therearound and the mouth of the funnel extending upwardly away from the ground. The inner surface of the cylinder is provided with at least one longitudinally aligned cleat, with each cleat being configured as a ledge with a short retaining lip and each cleat is dimensioned relative to objects being aligned thereby. Each cleat is configured and dimensioned to scoop up at least one of the objects introduced to the bottom of the cylinder (relative to the ground) and to securely seat one object thereon and is configured and dimensioned whereby objects not securely longitudinally seated directly on the cleat, fall off the cleat, with rotation of the cylinder, prior to vertical alignment of the cleat with the mouth of the funnel, and wherein each cleat is configured and dimensioned such that with further cylinder rotation, the securely longitudinally seated object falls into said funnel in an appropriate longitudinal alignment and each cleat thereafter rotates with rotation of the cylinder to scoop up additional objects. A divided strip carrier thereafter vertically separates the forward and rearwardly aligned objects and aligns them in a single direction.

4 Claims, 6 Drawing Sheets

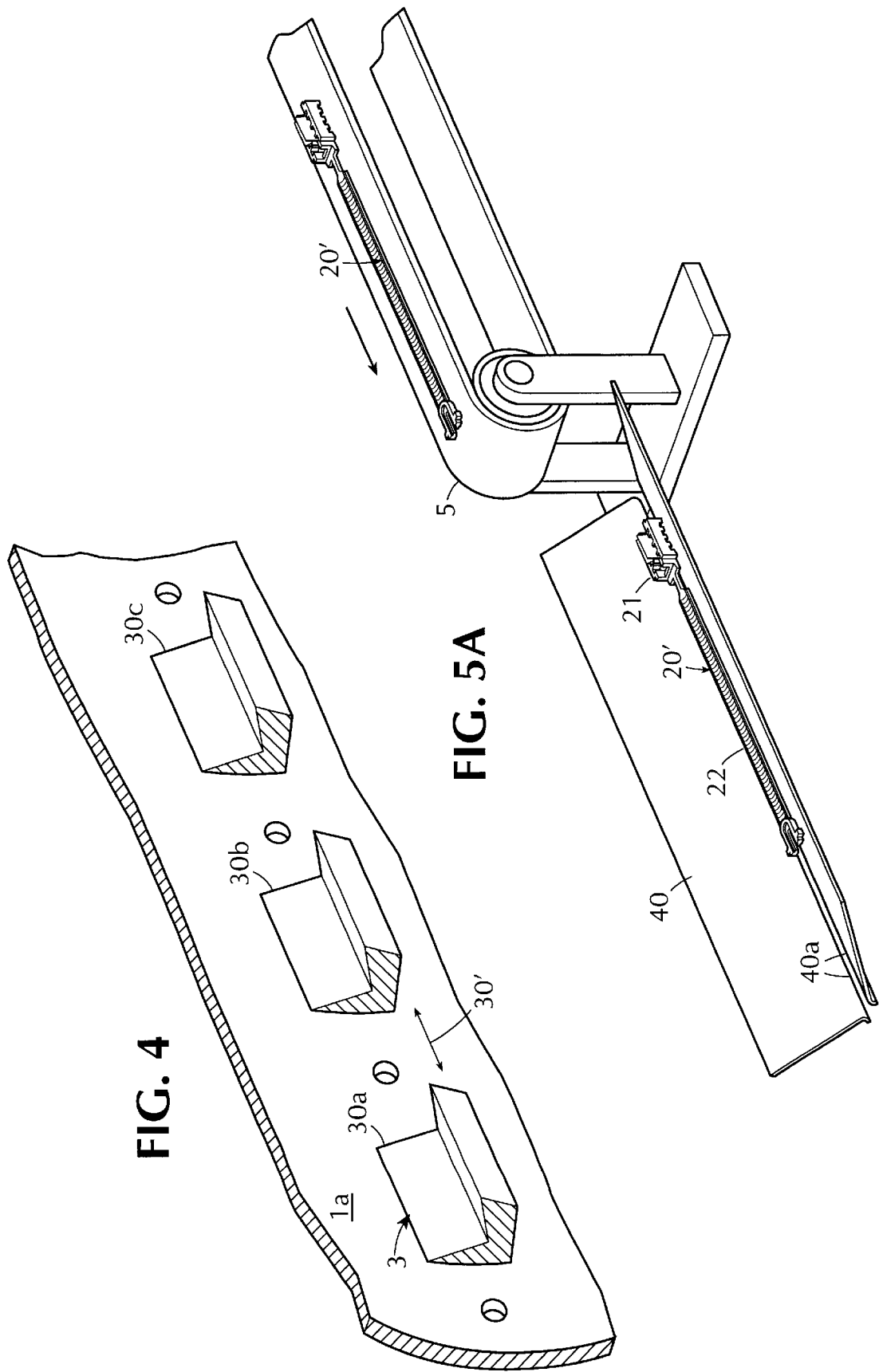

GRAVITY ASSISTED CYLINDER ALIGNING FEEDER AND ELEMENT SEPARATOR

FIELD OF THE INVENTION

This invention relates to methods and devices utilized in automatically aligning objects and particularly for use in aligning elongated objects as part of an automated processing system.

BACKGROUND OF THE INVENTION

Objects such as screws, nails, and elongated plastic leg elements in fastening devices such as described in U.S. Pat. No. 4,294,156, issued Oct. 13, 1981, usually require a longitudinal alignment such as for packaging or further processing into a finished product. These and other similar objects have, in the past, either been aligned by hand, a very costly and time consuming operation, or they have been aligned by vibration action in a bowl feeder. However, the vibration action tends to damage fragile parts and also sometimes results in tangled elements with possible jamming and the necessity for the complete shutdown of processing machinery.

SUMMARY OF THE INVENTION

It is accordingly an object of the present invention to provide a method and device for the non-vigorous ("gentle") handling and automated longitudinal aligning of objects and particularly elongated objects.

It is a further object of the present invention to provide said method and device with a rotating cylinder structure and object pickup structure which, in combination with gravity action, serves to positively align the objects in a desired uniform direction.

It is yet a further object of the present invention to provide a belt feed line, which further also automatically provides a single directional orientation for the aligned objects, which have ends of different width dimensions.

Generally the present invention comprises a device for the automated non-vigorous uniform alignment and uniform directional orientation of objects for subsequent automated packaging, processing, manufacturing and the like.

The device comprises longitudinal rotating means with object pick-up elements and wherein the pick-up elements comprises means for picking up objects in various alignments and further comprises means for initial removal of non-aligned objects from the pick-up elements and removal of aligned objects thereafter. Said device further comprises means for collecting the aligned objects, and maintaining the aligned objects in said alignment, but not the non-aligned objects, after removal of the aligned objects from the pick-up element. The device further optionally comprises means for orienting the aligned objects into a uniform orientation. Said orientation means comprises means for separating rearward from forward facing objects and means for re-combining said objects all in a rearward or forward facing orientation ("rearward" and "forward" are relative to a selected end configuration of the objects).

The alignment method of the present invention comprises the steps of:

a) using means for collecting and elevating appropriately aligned and non-aligned objects together; whereby at least one of said objects is securely seated within said collecting and elevating means;

b) using gravity to cause the non-aligned objects to fall off the elevating means prior to use of gravity for causing aligned and securely seated objects to fall off the elevating means, with only the aligned objects being collected and maintained in alignment and transported to processing means and wherein the non-aligned objects are returned to be elevated by said elevation means.

In a preferred embodiment, the collected and transported aligned objects, are further uniformly oriented by orienting means.

The above and other objects, features and advantages of the present invention will become more evident from the following discussion and drawings in which:

SHORT DESCRIPTION OF THE DRAWINGS

FIG. 4 is an isometric view of a segmented cleat;

Figure 5B:
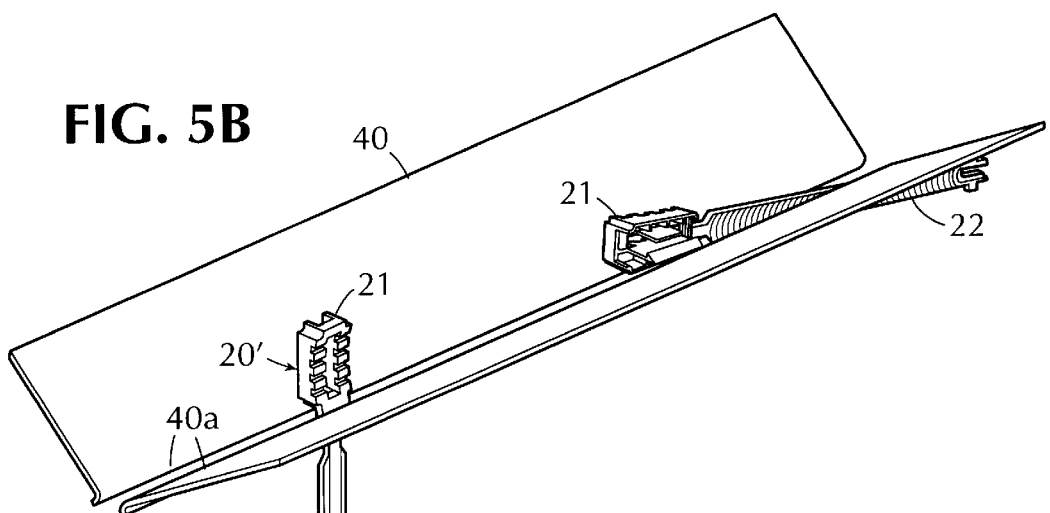
Figure 5C:
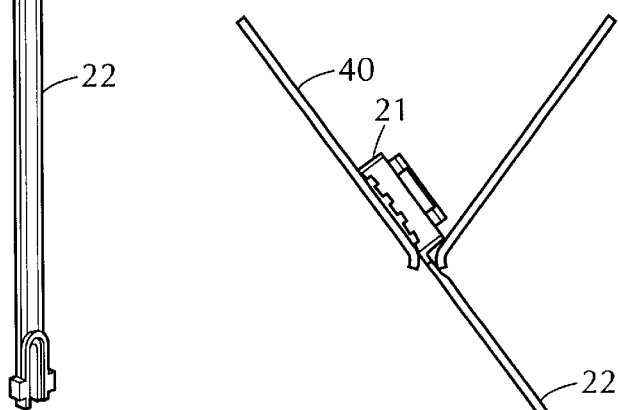
Figure 5D:
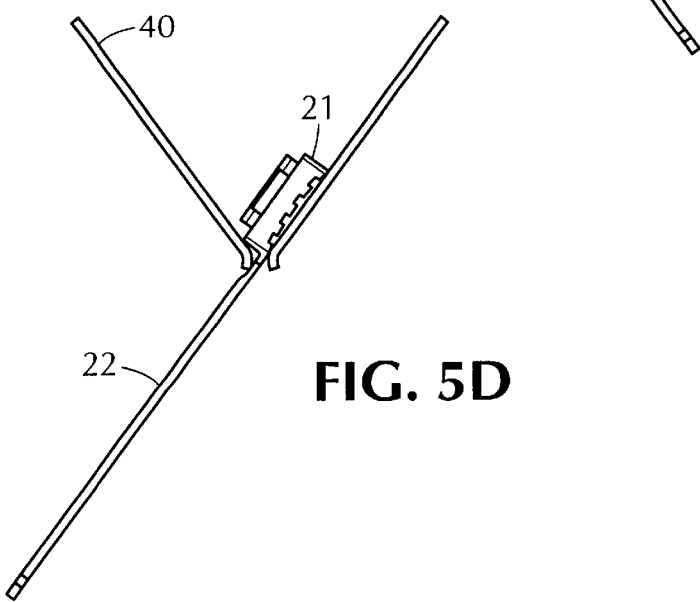
Figure 5E:
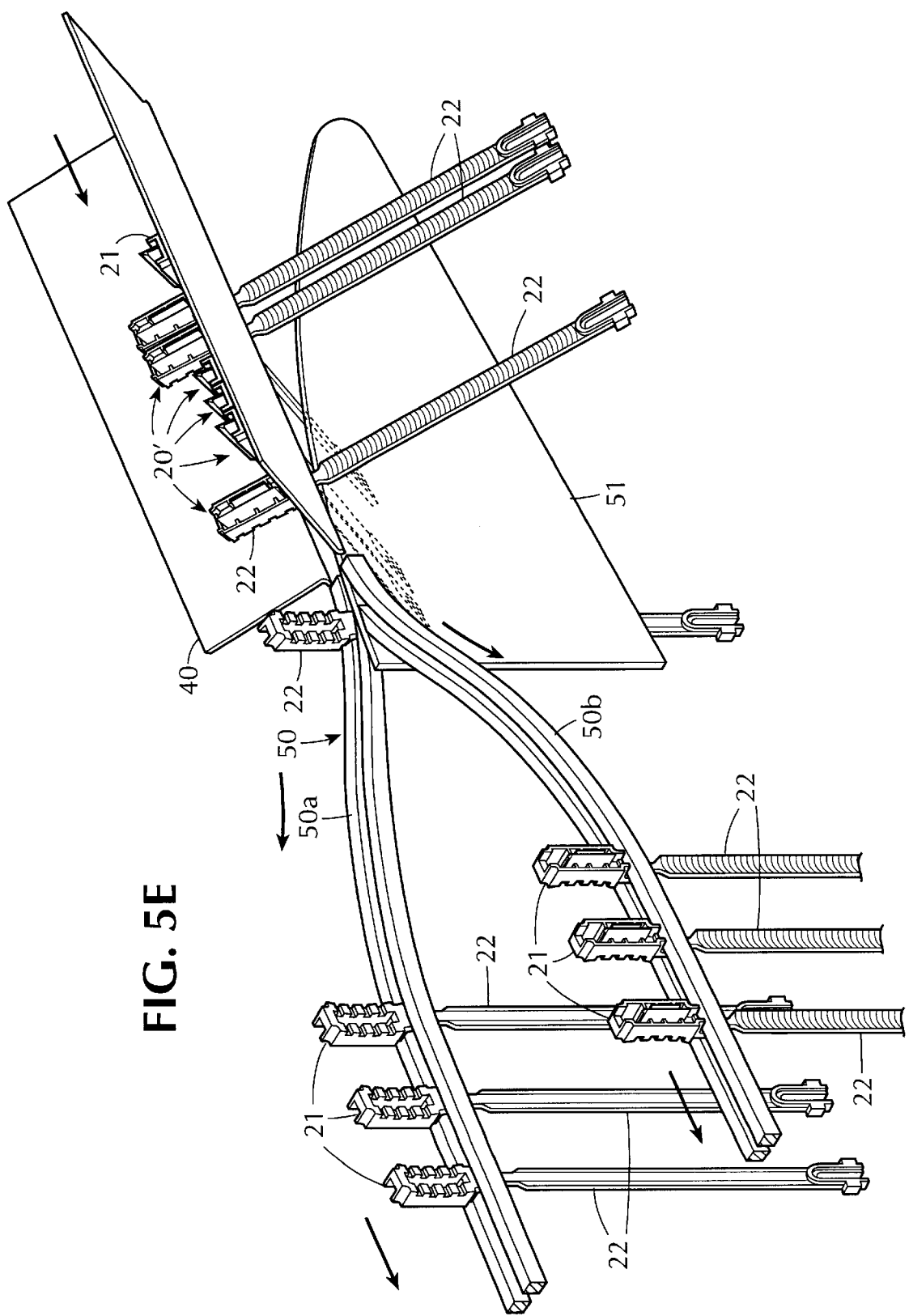
Figure 6B:
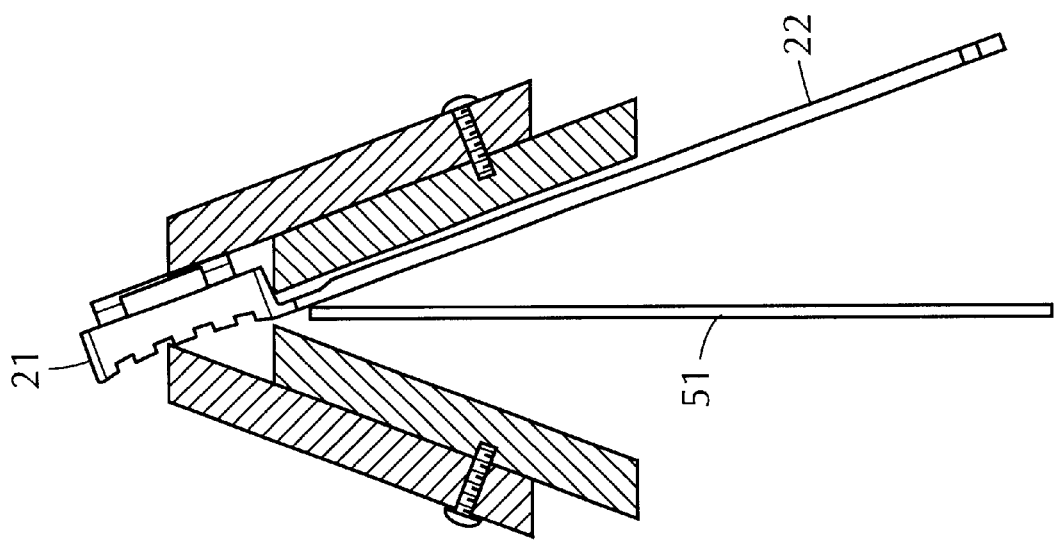
Figure 6A:
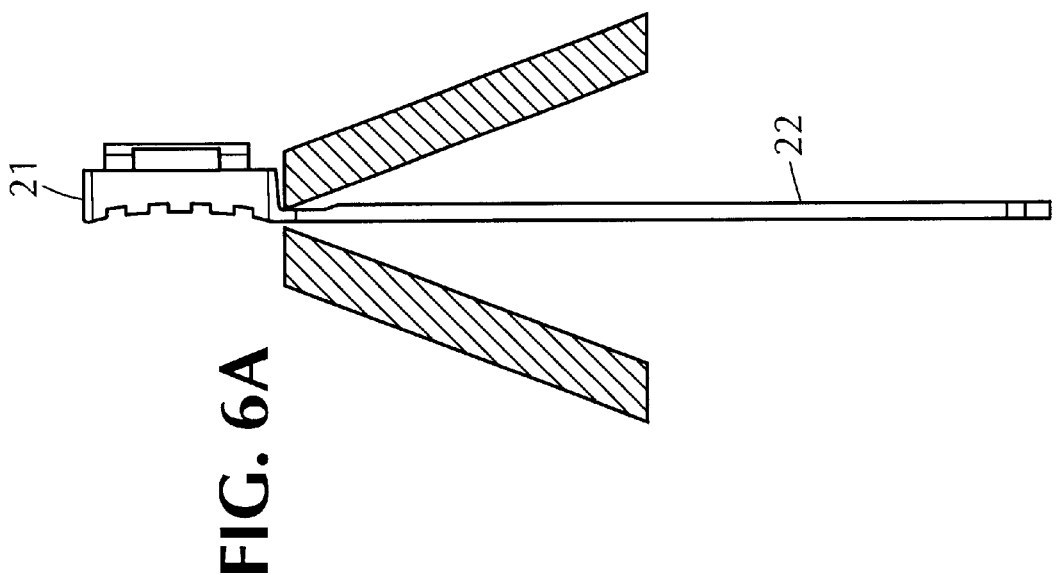

FIGS. 5a–e is a sequential series showing objects being separated according to aligned orientation as they are moved in a line; and FIG. 6 is a schematic depiction of the diverter or separation fin element used for the separation shown in FIGS. 5a–e.

DETAILED DESCRIPTION OF THE INVENTION

The alignment device of the present invention comprises a cylindrical or open ended cylinder element having a longitudinal axis positioned parallel to the ground, for gravitational effectiveness. The cylinder element is configured and adapted to be rotatable around its longitudinal axis. An elongated V shaped funnel element is longitudinally positioned within the center of the cylinder in a fixed position, with the cylinder being rotatable therearound and the mouth of the funnel extending upwardly away from the ground. The inner surface of the cylinder is provided with at least one longitudinally aligned cleat (or equivalent series of co-linear cleat segments), with each cleat being configured as a ledge with a short retaining longitudinal lip and each cleat is dimensioned relative to objects being aligned thereby (including the spacing between co-linear cleat segments). Each cleat is configured and dimensioned to scoop up at least one of the objects introduced to the bottom of the cylinder (relative to the ground) and to securely seat one object thereon. Each cleat is also configured and dimensioned whereby objects not securely longitudinally seated directly on the cleat, will fall off the cleat, during rotation of the cylinder, prior to vertical alignment of the cleat with the mouth of the funnel (i.e., whereby non-seated objects fall back to the bottom of the cylinder and not into the funnel). Each cleat is further configured and dimensioned whereby with continued cylinder rotation, the securely longitudinally seated object falls into said funnel and is transported thereaway by a moving belt at the base of the funnel. Each cleat thereafter rotates, with rotation of the cylinder, to scoop up additional objects.

The funnel is dimensioned with a V shaped cross section with a narrow base sufficient to hold the object in the requisite alignment and to prevent skewing from such alignment. The sloped sides of the funnel guide the objects into the requisite alignment maintained by the base. The base opens into a closely adjacent moving belt for transport of the aligned objects for further processing.

After the objects have been aligned, and if required, orientation means are used to orient objects in a uniform facing direction (alignment per se causes the objects to be longitudinally aligned but does not necessarily orient front and rear positioning). Accordingly the orientation means separates the forward and rearwardly (relative to an end configuration of the objects) aligned objects and orients them in a single direction. In this regard, when the objects have ends of differing widths, the belt carries the objects to slotted separation means wherein the objects pass over a slot dimensioned to permit the narrower body and one end of the strip to fall through while another, wider end, is retained by the peripheral edges of the slot (with the objects falling front end first or rear end first). The slot is dimensioned to cause the wide head of the objects to face either left or right, with the lower body of the object tilting oppositely. The slotted separation means is positioned with a downward slant to cause the slot-retained objects to ride downwardly and forward to a divider fin which separates right and left body biased objects into two separate lines, each of identically aligned and oriented objects for subsequent appropriate packaging, processing or manufacturing. Except for a short drop by objects not seated in the cleats the process involves minimal motion or agitation of the objects and even the short drop is of only slightly more agitation in a rapid non-traumatic separation process.

DETAILED DESCRIPTION OF THE DRAWINGS AND THE PREFERRED EMBODIMENT

Figure 1:
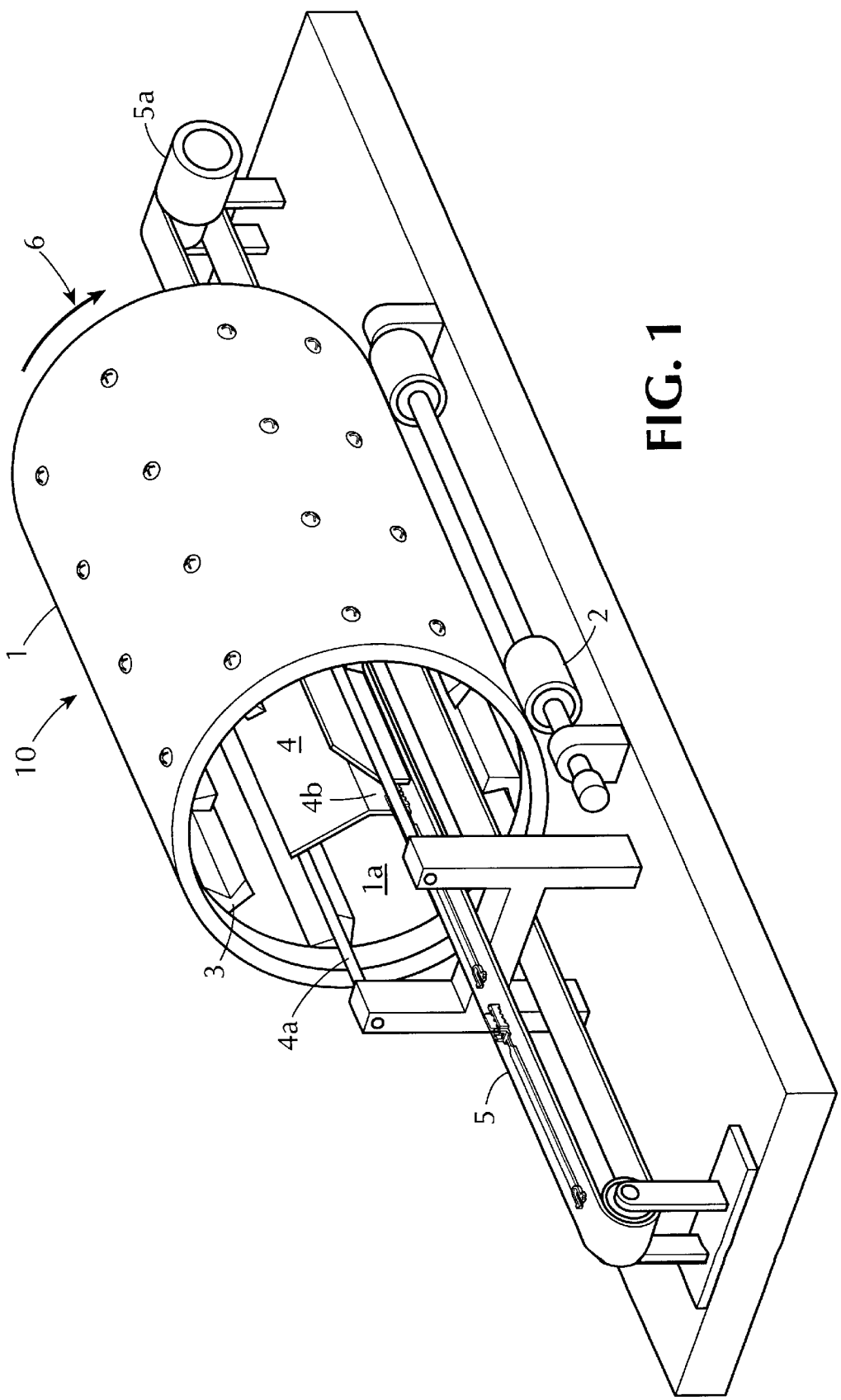
FIG. 1 is an isometric view of alignment device of the present invention.

With specific reference to the drawings, in FIG. 1, alignment device 10 comprises open ended barrel or cylinder element 1, seated on support rollers 2, with the cylinder element being rotated in the direction of the arrow by an attached motor (not shown). The inner surface 1a of the cylinder element is provided with a plurality of cleat elements 3 extending parallel relative to a longitudinal axis L. Elongated funnel 4 extends along the length of the cylinder, along the longitudinal axis, and is spaced from the inner surface 1a. External support elements 4a maintain the spacing from the cylinder inner surface. The base 4b of the funnel 4 is open and lead onto an upper surface of drive belt 5, driven by drive belt motor 5a. Object feed chute 6, at the rear of the open ended cylinder element provides the objects 20 to the cylinder for alignment. The cylinder element 1 is longitudinally positioned relative to the ground to utilize the effect of gravity, as will be described.

Figure 2:
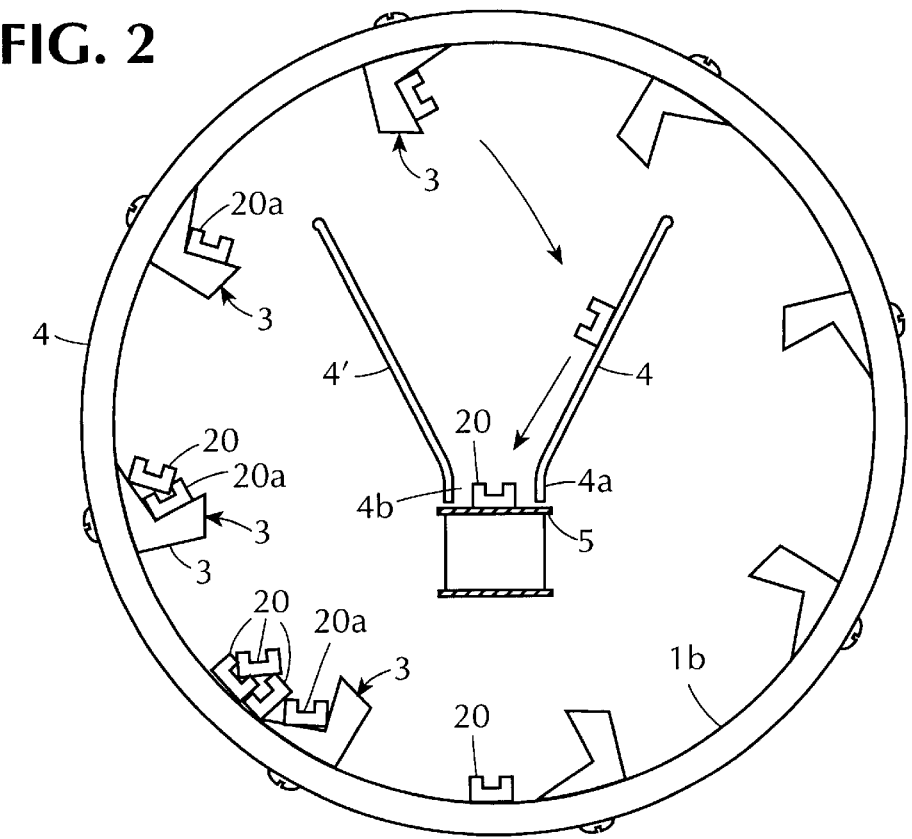
FIG. 2 is an interior end view of the rotating cylinder of the device of FIG. 1 with objects being picked up for alignment.
Figure 3:
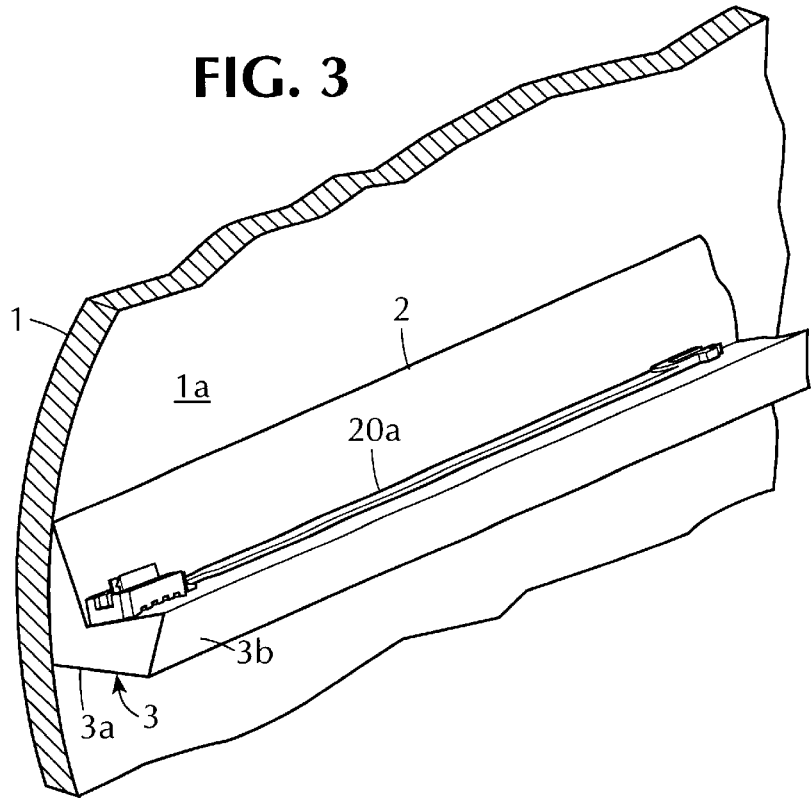
FIG. 3 is an isometric view of one form of scooping or pick-up cleat.

As more clearly seen in FIG. 2, the objects 20, shown as strap leg elements for an anchor as disclosed in said patent, are fed to the bottom of the cylinder 1b. As the cylinder turns in the direction shown, cleat elements 3, each configured with base 3a and extending ledge section 3b, initially gently scoop up a number of objects 20. All the objects 20 except the one directly seated on the ledge are relatively unstably positioned whereby, as the cylinder turns, they fall off back to the bottom of the cylinder. The cleats are configured whereby the stably positioned object 20a falls off the cleat only after the cleat has cleared alignment with a tapered wall 4' of funnel element 4, whereby the object falls into the funnel 4. FIG. 3 depicts the full length configuration of the cleat element 3 relative to an object 20a and the stable configuration of the object on the cleat element. Alternatively, as shown in FIG. 4, the cleat may comprise segmented elements 30a–c provided that the spaces 30' therebetween are shorter than the length of the objects 20, whereby multiple segments can support the objects.

When the object 20' falls into funnel 4, the slanted walls 4' thereof guide the objects, into longitudinal alignment onto drive belt 5, adjacent the open end base 4b of the funnel.

As seen in sequence in FIGS. 5a–e, drive belt 5 carries the objects 20' to downwardly tilted (to continue a forward motion with a gravity assist) bottom-slotted vee element 40 (FIG. 5a). Depending on the direction of alignment (head forward or rearward) of the objects 20' (FIG. 5b) the wider head 21 of the object is retained by the edges 40a of the slot 40 as the narrow end 22 of the object falls through the slot. The slot width, in the embodiment shown, is insufficient to maintain the object in the initial orientation as the object drops through the slot. Instead, because of the sized dimensions of the slot the objects randomly twist to assume an orientation, as shown in FIGS. 5c and 5d, with the head 21 of the object either falling to the left, as the narrow end tilts to the right (FIG. 5a), or with the head falling to the right and the narrow end tilting to the left (FIG. 5b).

Thereafter, the oppositely extending objects, as shown in FIG. 5e, continue downwardly (with a gentle vibration assist) to separation track 50 having a divider fin 51, whereby oppositely extending objects 20' are guided into tracks 50a and 50b with all the objects on each of the tracks having the same alignment and orientation. The objects carried on each of the tracks are then guided and carried to manufacturing, assembly, or packaging station respectively adapted to the particular orientation of objects carried on the tracks 50a and 50b.

It is understood that the above description and drawings are merely illustrative of the present invention and that changes in structure of the alignment device, as well as orientation and the nature and structure of the objects being aligned as well as other changes are possible without departing from the scope of the present invention as defined in the following claims.

What is claimed is:

1. A device for the automated non-vigorous uniform alignment and uniform directional orientation of objects for subsequent automated processing, said device comprising:

v) longitudinal rotating means with object pick-up elements and wherein the pick-up elements comprises means for picking up objects in various alignments;

vi) means for removal of non-aligned objects from the pick-up elements;

vii) means for removal of aligned objects thereafter; and viii) means for collecting the removed aligned objects, and maintaining the aligned objects in said alignment, but not the removed non-aligned objects, wherein the longitudinal rotating means comprises a cylindrical element having a longitudinal axis positioned parallel to the ground whereby the cylindrical element is configured and adapted to be rotatable around the longitudinal axis; wherein the inner surface of the cylinder element is provided with at least one longitudinally aligned cleat, with each cleat being configured as a ledge with a short retaining longitudinal lip, wherein each cleat is configured and dimensioned to scoop up at least one of the objects introduced to the bottom of the cylinder element, relative to the ground, and to securely seat one object thereon, wherein each cleat is further configured and dimensioned whereby objects not securely longitudinally seated directly on the cleat, fall off the cleat, during rotation of the cylinder element, whereby objects not securely seated fall back to the bottom of the cylinder element and wherein with continued cylinder element rotation, the securely longitudinally seated object falls into said collecting means, and wherein each cleat thereafter rotates, with rotation of the cylinder element, to scoop up additional objects for subsequent alignment.

2. The device of claim 1, wherein the device further comprises means for orienting the collected aligned objects having rear and forward, relative to movement of the objects on a moving line member, ends of different configurations, into a uniform end orientation, with said orientation means comprising means for separating rearward from forward facing objects and means for re-combining said objects all in a left or right facing orientation.

3. A device for the automated non-vigorous uniform alignment and uniform directional orientation of objects for subsequent automated processing, said device comprising:
   i) longitudinal rotating means with object pick-up elements and wherein the pick-up elements comprises means for picking up objects in various alignments;
   ii) means for removal of non-aligned objects from the pick-up elements;
   iii) means for removal of aligned objects thereafter; and
   iv) means for collecting the removed aligned objects, and maintaining the aligned objects in said alignment, but not the removed non-aligned objects,
   wherein the longitudinal rotating means comprises a cylindrical element having a longitudinal axis positioned parallel to the ground whereby the cylindrical element is configured and adapted to be rotatable around the longitudinal axis; wherein said collecting means comprises an elongated V shaped funnel element longitudinally positioned within the center of the cylinder element, wherein the mouth of the funnel extends upwardly away from the ground, with a moving belt being positioned at the base of the funnel, with the cylinder element being rotatable around the funnel and belt; wherein the inner surface of the cylinder element is provided with at least one longitudinally aligned cleat, with each cleat being configured as a ledge with a short retaining longitudinal lip, wherein each cleat is configured and dimensioned to scoop up at least one of the objects introduced to the bottom of the cylinder element, relative to the ground, and to securely seat one object thereon, wherein each cleat is further configured and dimensioned whereby objects not securely longitudinally seated directly on the cleat, fall off the cleat, during rotation of the cylinder element, prior to vertical alignment of the cleat with the mouth of the funnel, whereby non-seated objects fall back to the bottom of the cylinder element and wherein each cleat is further configured and dimensioned whereby, with continued cylinder element rotation, the securely longitudinally seated object falls into said funnel and is transported thereaway by the moving belt at the base of the funnel, and wherein each cleat thereafter rotates, with rotation of the cylinder element, to scoop up additional objects for subsequent alignment.

4. A device for the automated non-vigorous uniform alignment and uniform directional orientation of objects for subsequent automated processing, said device comprising:
   i) longitudinal rotating means with object pick-up elements and wherein the pick-up elements comprises means for picking up objects in various alignments;
   ii) means for removal of non-aligned objects from the pick-up elements;
   iii) means for removal of aligned objects thereafter; and
   iv) means for collecting the removed aligned objects, and maintaining the aligned objects in said alignment, but not the removed non-aligned objects;
   wherein the device further comprises means for orienting the collected aligned objects having rear and forward, relative to movement of the objects on a moving line member, ends of different configurations, into a uniform end orientation, with said orientation means comprising means for separating rearward from forward facing objects and means for re-combining said objects all in a left or right facing orientation;
   wherein the device the orientation means comprises, when the objects have ends of differing narrow and wider widths, slotted separation means co-linear with said belt and with a divider fin at an end of the slotted separation means distal to the belt, such that the belt carries the objects to the slotted separation means, where the objects pass over a slot dimensioned to permit the narrow end of the object to fall therethrough while the wider end is retained by the peripheral edges of the slot, wherein the respective objects fall either front end first or rear end last, wherein the slot is further dimensioned to cause the wide head of the objects to face either left or right, with the other end of the object tilting oppositely; wherein the slotted separation means is directioned with a downward slant relative to the ground to thereby cause the slot-retained objects to ride downwardly to the divider fin which separates right and left body biased objects into two separate lines, each of identically aligned and oriented objects for subsequent appropriate combination into a single orientation.

* * * * *